United States Patent [19]

Flater

[11] Patent Number: 4,788,407
[45] Date of Patent: Nov. 29, 1988

[54] SPOT WELDING ELECTRODE APPARATUS

[76] Inventor: Anders H. Flater, 2360 Sheridan Rd., Highland Park, Ill. 60035

[21] Appl. No.: 113,492

[22] Filed: Oct. 28, 1987

[51] Int. Cl.$^4$ .............................................. B23K 9/24
[52] U.S. Cl. ................................ 219/120; 219/86.31; 137/614.11
[58] Field of Search ................ 219/120, 86.25, 86.31; 137/614.11, 601

[56] References Cited

U.S. PATENT DOCUMENTS 1,706,230  3/1929  Hilger ............................ 137/601 X Primary Examiner—E. A. Goldberg
Assistant Examiner—Melissa C. Chiu

[57] ABSTRACT

A spot welding electrode valve includes a body having an upper and a lower tapered portion and containing a hollow valve which houses a spring loaded sensor having a valve portion. The spot welding electrode valve is adapted to be mounted to a standard resistance welding electrode through its upper tapered end portion and in the mounted position the valves in the body are closed so as to circulate coolant fluid through the body and the welding electrode. The lower tapered end portion is adapted to receive a welding cap or tip which when mounted actuates the sensor to open the valves in the body to allow coolant fluid to flow inside the welding cap or tip and to remove heat generated in the welding process. When the welding cap or tip is removed for replacement or repair, the sensor will automatically close the valves in the body and confine circulation of the coolant fluid inside the spot welding electrode valve and welding electrode without external release. One purpose of the spot welding electrode valve is to allow replacement of welding caps or tips, particularly with regard to multi-electrode resistance welding machines, without the need to close the main coolant flow valve of the system.

10 Claims, 3 Drawing Sheets

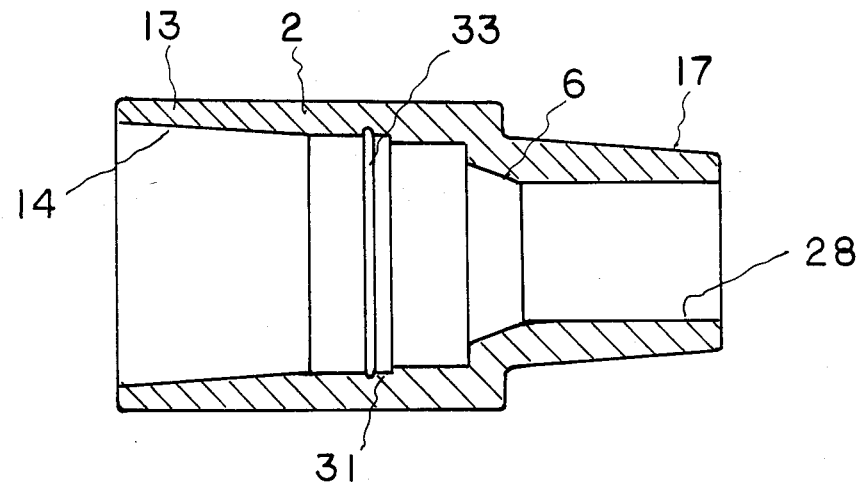
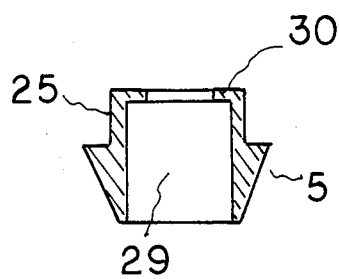
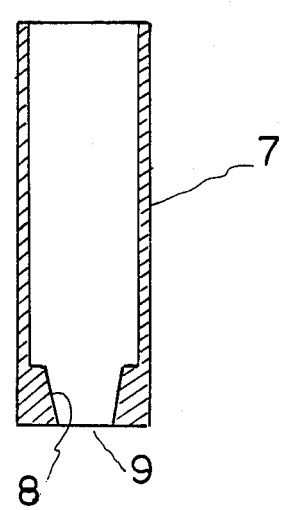
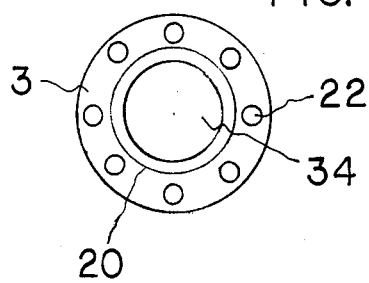
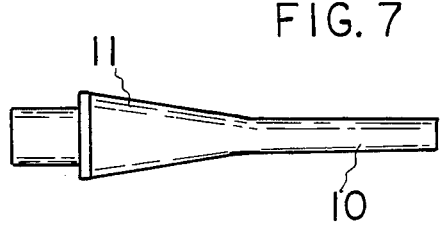

SPOT WELDING ELECTRODE APPARATUS

BACKGROUND OF THE INVENTION

The present invention relates, in general, to resistance spot welding equipment and, more specifically, to spot welding electrodes containing fluid cooled welding caps or tips.

Resistance spot welding is a process commonly used to join two thin metal sheets together. A spot weld is produced by clamping two thin sheets of metal together under high pressure between two axially aligned electrodes and passing a high electrical current between the electrodes through the metal sheets. The high resistance at the interface of the two metal sheets causes heating of the sheets in an area between the contact surfaces of the electrodes. This rapid heating creates a molten zone of metal which, when cooled, forms a solid weld spot or nugget fusing the two metal sheets together.

The electrodes used to form a spot weld are typically constructed of a high electrically conductive material, such as copper. The electrodes may have an integral single piece form or may be constructed of a holder or shank portion which receives a replaceable cap or tip at one end. The caps or tips are usually of female or male configuration. The female electrode has an open mounting end whereas the male electrode contains a tapered mounting nipple. The interior of the electrode caps or tips is provided with coolant fluid flow paths for the purpose of removing heat generated during the welding operations. The holder or shank portion contains conduits for coolant fluid which flow is controlled by one hand operated main valve on single as well as multi-electrode welding machines.

During repeated spot welding operations, the elctrode caps or tips experience considerable deformation or wear at their contact surface due to the high clamping pressures required and heat generated by the current passing through the weld zone. Thus frequent reshaping or replacement of the electrode caps or tips is required in order to maintain the desired weld quality. When replacing one cap or tip, the main fluid valve needs to be shut off in order to prevent coolant fluid to flow out of the open mounting end when the cap or tip is removed. However, closing the main coolant fluid valve, particularly on multi-electrode welding machines, has the effect of shutting off coolant fluid to all the electrodes when only one or a pair of caps or tips need to be replaced. The alternative is to let the coolant fluid spill out of the open mounting end when replacing one welding cap or tip which action is both hazardous and wasteful. It would therefore be desireable to provide a spot welding electrode valve for each welding cap or tip and which would automatically regulate the coolant fluid flow during individual cap or tip replacements without affecting the cooling capacity of the other electrodes of the welding machine.

SUMMARY OF THE INVENTION

The above and other objectives of the preferred embodiment of the invention are accomplished by a spot welding electrode valve which includes a body having a tapered upper portion and a tapered lower portion. The body houses a hollow stem valve which at its dispensing end contains a spring loaded sensor having a valve portion. The tapered upper portion of the body is adapted to be fitted to the standard mounting end of a welding electrode and when mounted, the stem valve and sensor valve are in a close position which allows circulation of the coolant fluid inside the welding electrode and holder. The lower tapered portion of the body is adapted to receive a welding cap or tip which when mounted will actuate the sensor and open the stem valve and sensor valve to allow the coolant fluid to flow inside the welding cap or tip and through the welding electrode and holder. When the welding cap or tip is removed from the tapered lower portion of the body, the sensor will automatically actuate the closing of the stem valve and sensor valve to allow circulation of the coolant fluid inside the welding electrode without release through the tapered lower portion.

A spot welding electrode valve in accordance with the invention will now be described by way of example, with reference to the accompanying drawings in which:

FIG. 3 is an enlarged sectional elevation of a body according to the invention.

FIG. 4 is an enlarged sectional elevation of a valve stem according to the invention.

FIG. 5 is an enlarged sectional elevation of a valve stem according to the invention.

FIG. 6 is an enlarged sectional elevation of a retainer.

FIG. 7 is an enlarged elevational view of a sensor.

DESCRIPTION OF THE PREFERRED EMBODIMENT

As is conventional in spot welding operations, a pair of axially aligned electrodes are brought together under high force or pressure on opposite side of two relatively thin sheets of metal and an electric current is passed between the electrodes through the sheets.

The term electrode, as used in the present invention, describes that portion of a spot welding apparatus which contacts the metal sheets under high force or pressure and directs current flow through the clamped sheets in an area corresponding to the contact surface of the electrode. The electrode may be formed of a clamping arm containing a tubular conduit having a tapered mounting portion. The clamping arm and tubular conduit may contain separate passages for the supply and return of electrode coolant fluid. The mounting portion of the conduit is generally adapted to receive a welding cap or tip which contacts the metal sheets to be welded.

Figure 1:
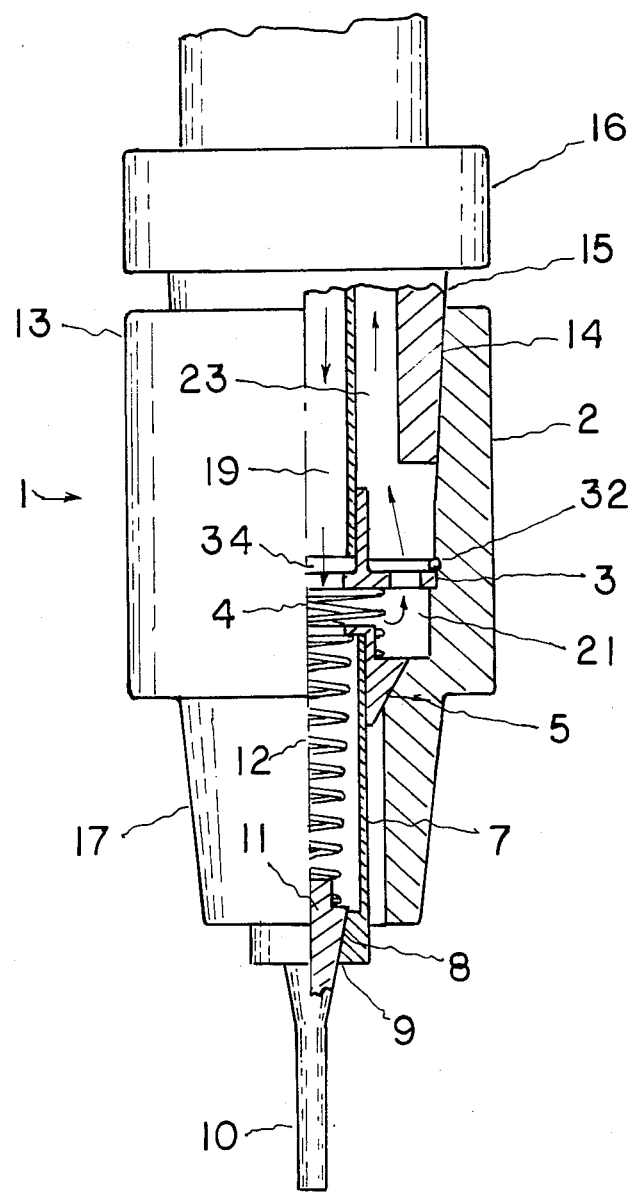
FIG. 1 is an enlarged elevational and partial sectional view of the spot welding electrode valve of the present invention without a welding cap or tip.

As shown by way of example in FIG. 1 and the following figures and description, the spot welding electrode valve 1 includes body 2 containing retainer 3 and valve spring 4. The valve 5 which is contained within valve seat 6 of the body 2 is attached to valve stem 7 having sensor valve seat 8 and orifice 9 and contains sensor 10 having sensor valve (stem valve) 11 connected to sensor spring 12.

The upper end portion 13 of body 2 has an inside taper 14 which is adapted to the mounting portion 15 of electrode conduit (holder) 16. The lower end tapered portion 17 of the body 2 is adapted to receive a welding cap or tip 18.

In operation, the spot welding electrode valve is fitted to the mounting portion 15 of the electrode conduit 16 as depicted in FIG. 1. In this mode, the valve 5 is held in a closed position against valve seat 6 by valve spring 4 and sensor valve 11 is equally in a closed position against sensor valve seat 8 by sensor spring 12 whereby the coolant fluid is circulated within the spot welding electrode valve as indicated by the arrows. Accordingly, the coolant fluid enters through supply tube 19 which connects to collar portion 20 of retainer 3. The coolant fluid is thus directed through retainer center hole 34 and through space 21 between valve 5 and retainer 3 and escapes through holes 22 in retainer 3 into the return passage 23 inside electrode conduit 16 to complete the coolant fluid cycle.

Figure 2:
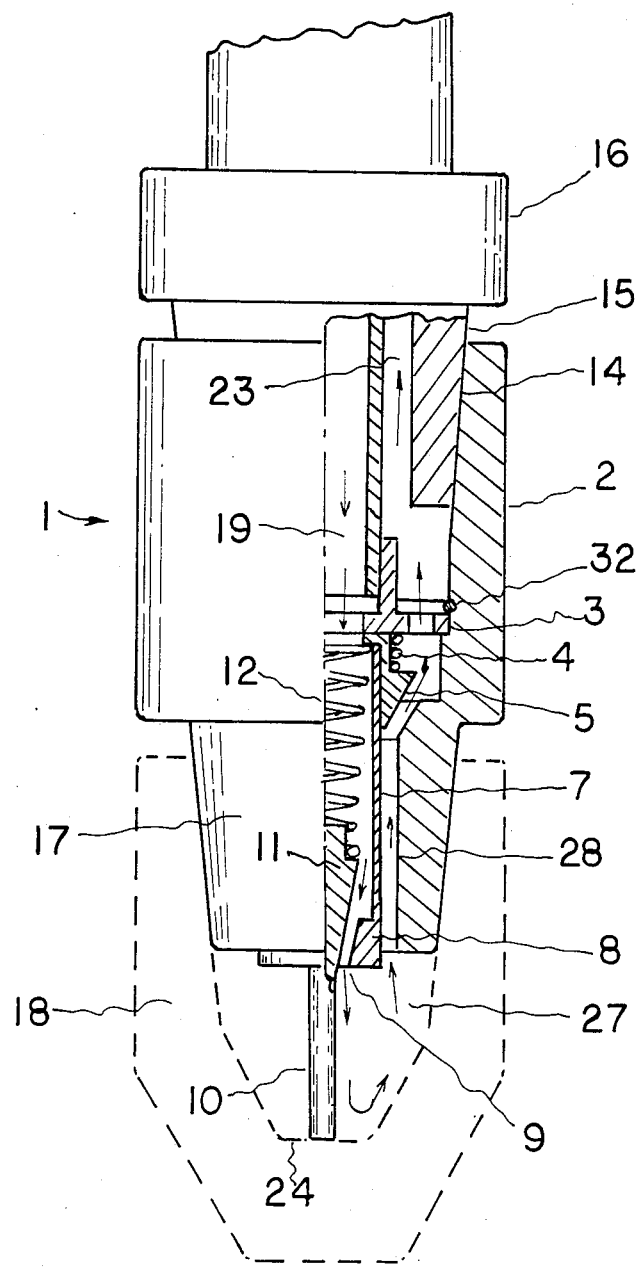
FIG. 2 is an enlarged elevational and partial sectional view of the spot welding electrode valve of the present invention with a welding cap or tip.

As indicated in FIG. 2 and the following figures, when a cap or tip 18 is fitted to the lower tapered portion 17 of the body 2, the inside surface 24 of welding cap or tip 18 causes sensor 10 to react against sensor spring 12. Sensor spring 12, which is anchored by counterbore 30 in valve 5 and has a higher resistance to compression than valve spring 4, thus forces the protruding portion 25 of valve 5 against retainer 3 which action lifts valve 5 off valve seat 6. At this point, the sensor spring 12 compresses to lift sensor valve 11 off sensor valve seat 8. The coolant fluid, flowing in the supply tube 19, is now directed through the inside of stem 7 and exits through orifice 9 into the welding cap or tip cavity 27 to absorb heat generated in the welding process. The coolant fluid is then returned, as indicated by the arrows, through the space between the outside wall of stem 7 and the inside wall 28 of the lower portion 17 and escapes through holes 22 in retainer 3 into the return passage 23 inside electrode conduit 16 to complete the coolant cycle.

When the welding cap or tip needs to be replaced or removed for any reason, the sensor spring 12 closes sensor valve 11 onto sensor valve seat 8 and valve spring 4 closes valve 5 against valve seat 6 which actions are precipitated by the closing force on the respective valves by the coolant fluid pressure. The coolant fluid is then circulated through the spot welding electrode valve 1 and electrode conduit 16 as indicated in FIG. 1 without escaping to the outside of the spot welding electrode valve.

The spot welding electrode valve is constructed of electrically conductive material such as copper and assembled by placing the sensor 10 and sensor spring 12 inside the valve stem 7 which is then press fitted to the recess 29 in the valve 5. The valve and stem assembly is placed inside the body 2 against valve seat 6 and valve spring 4 is located around the protruding portion 25 of valve 5 to be anchored by retainer 3. The retainer 3 is held against ledge 31 in body 2 by clip 32 in groove 33.

In summary, a spot welding electrode valve has been disclosed which overcomes the problem of replacing individual welding caps or tips while the coolant fluid flow is activated. Accordingly, the spot welding electrode valve of the present invention will considerably shorten the time required for welding cap or tip replacements and maintenance, particularly with regard to multi-electrode welding machines, and in the process save coolant fluid with increased safety and cleanliness in the workplace. Also, there is no risk associated with the common failure to turn on the coolant fluid flow after each cap or tip replacement since the main coolant fluid valve need not to be shut off for that purpose.

It will be appreciated that, while essentially portraying the subject spot welding electrode valve, the enclosed drawings should not limit the scope of the invention in general.

What is claimed is:

1. A spot welding electrode apparatus comprising: a body having an upper end removably emplaceable on an electrode holder and a lower end on which there is removably emplaceable weld cap, a stem valve seated inside the body and containing a spring and a sensor, the sensor having a valve portion seated inside the stem valve; a retainer contained in the body and having a seat for the stem valve; the body comprising a conduit for electrical current and coolant fluid between the electrode holder and the welding cap, the emplacement of the welding cap on the lower end activates the sensor to position the stem valve and valve portion whereby the coolant fluid is flowing from the electrode holder and circulated inside the body and the welding cap, the emplacement of the welding cap off the lower end activates the sensor to position the stem valve and valve portion whereby the coolant fluid is flowing from the electrode holder and circulated inside the body.

2. A spot welding electrode apparatus according to claim 1 wherein the retainer contains a collar adapted to receive a coolant fluid supply tube.

3. A spot welding electrode apparatus according to claim 1 wherein the retainer contains passages for coolant fluid flow.

4. A spot welding electrode apparatus according to claim 1 wherein the body contains a valve seat adapted to the hollow valve.

5. A spot welding electrode apparatus according to claim 1 wherein the hollow valve contains a valve seat adapted to the valve portion of the sensor.

6. A spot welding electrode apparatus according to claim 1 wherein the sensor is adapted to be activated through contact with the inner portion of the welding cap or tip as it is mounted on the lower tapered end portion.

7. A spot welding electrode apparatus according to claim 1 wherein the hollow valve and sensor valve portion direct the electrode coolant fluid flow within the the body and welding electrode when a cap or tip is removed from the lower tapered end portion.

8. A spot welding electrode apparatus according to claim 1 wherein the hollow valve and sensor valve portion direct the coolant fluid flow within the inside cavity of the welding cap or tip and then returning the coolant fluid through the body and welding electrode when a cap or tip is mounted on the lower tapered end portion.

9. A spot welding electrode apparatus according to claim 1 wherein the lower tapered end portion is adapted to receive a standard fitting of a welding cap or tip.

10. A spot welding electrode apparatus according to claim 1 wherein the upper tapered end portion is adapted to a standard fitting of a welding electrode.

* * * * *